Jan. 21, 1930.　　A. C. LINDGREN ET AL　　1,744,479
ATTACHMENT FOR STUBBLE PULVERIZERS
Filed Feb. 8, 1928　　3 Sheets-Sheet 1
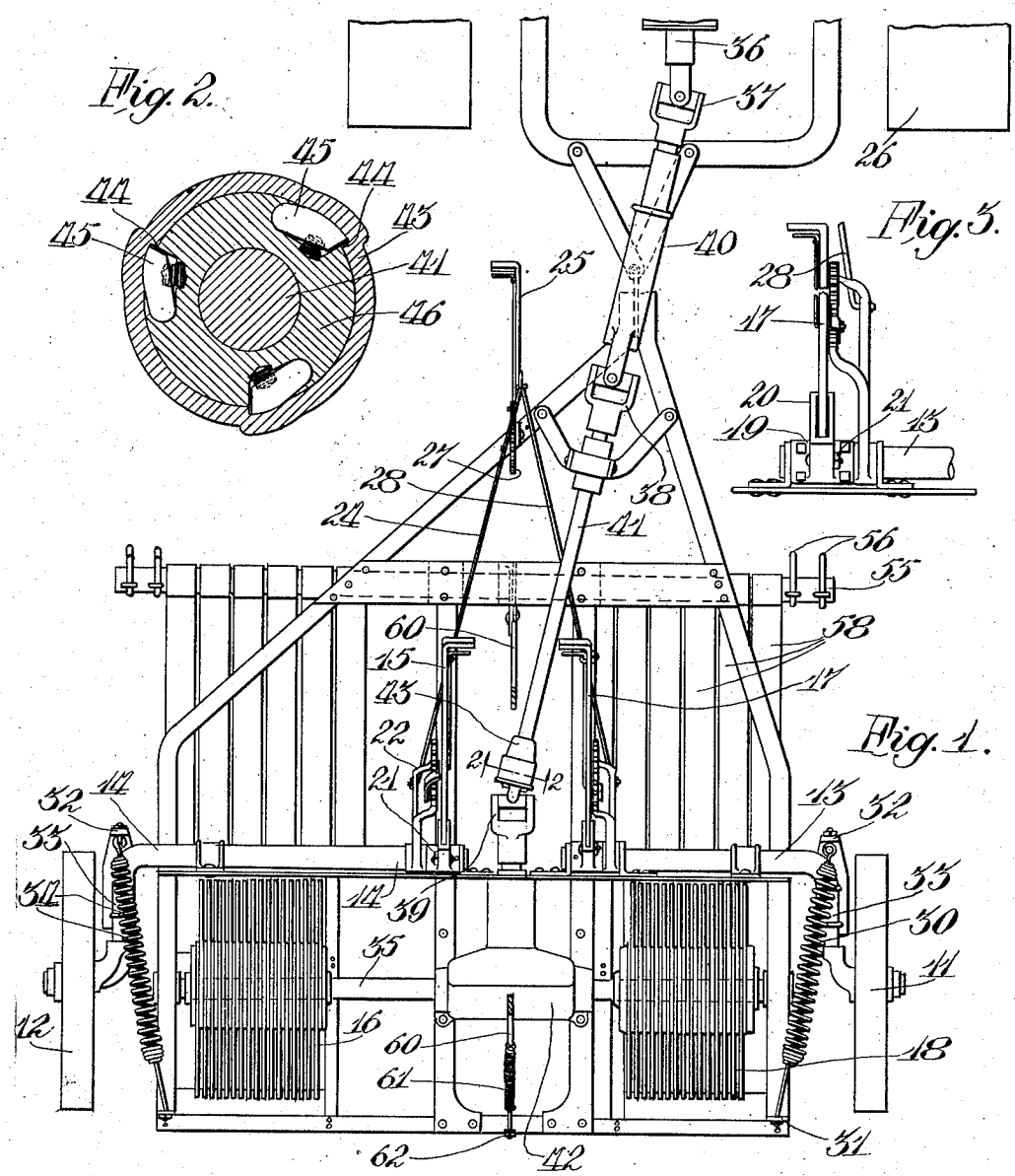
Inventors
Alexus C. Lindgren
Bert R. Benjamin
George M. Merwin
By H. P. Deestute
Atty.

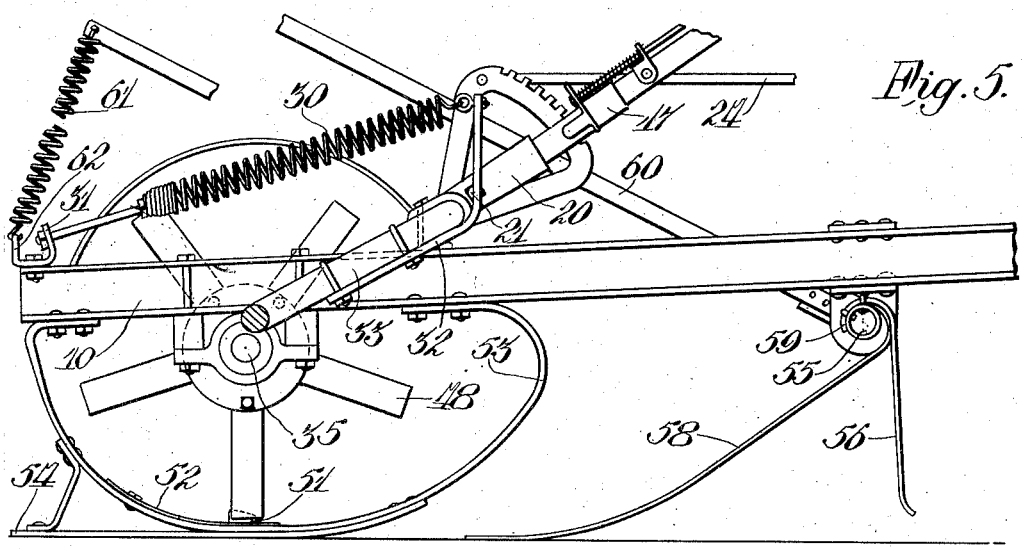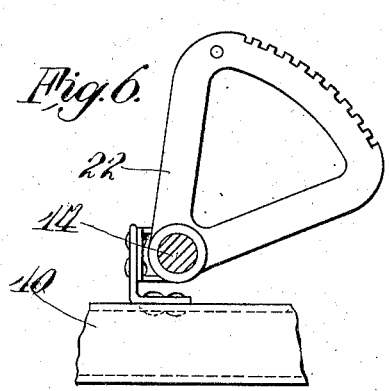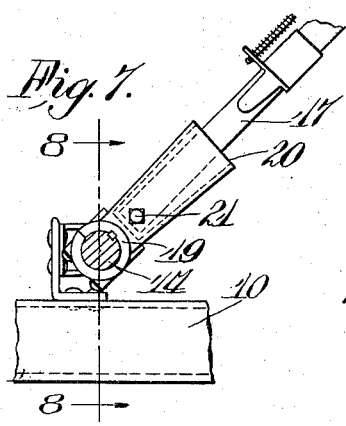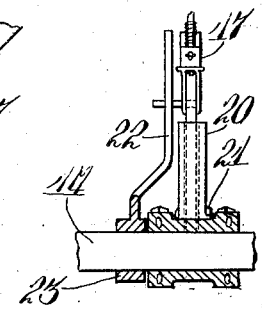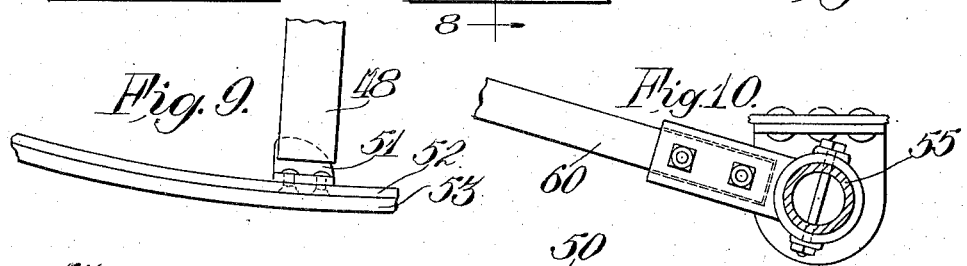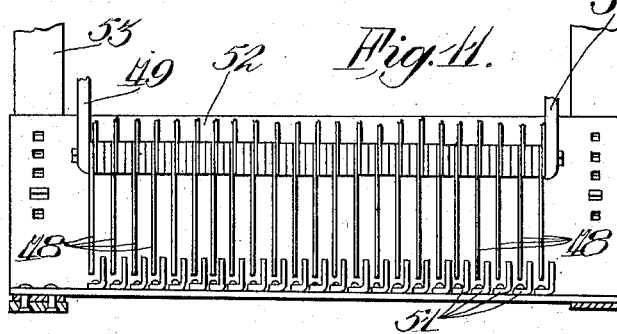

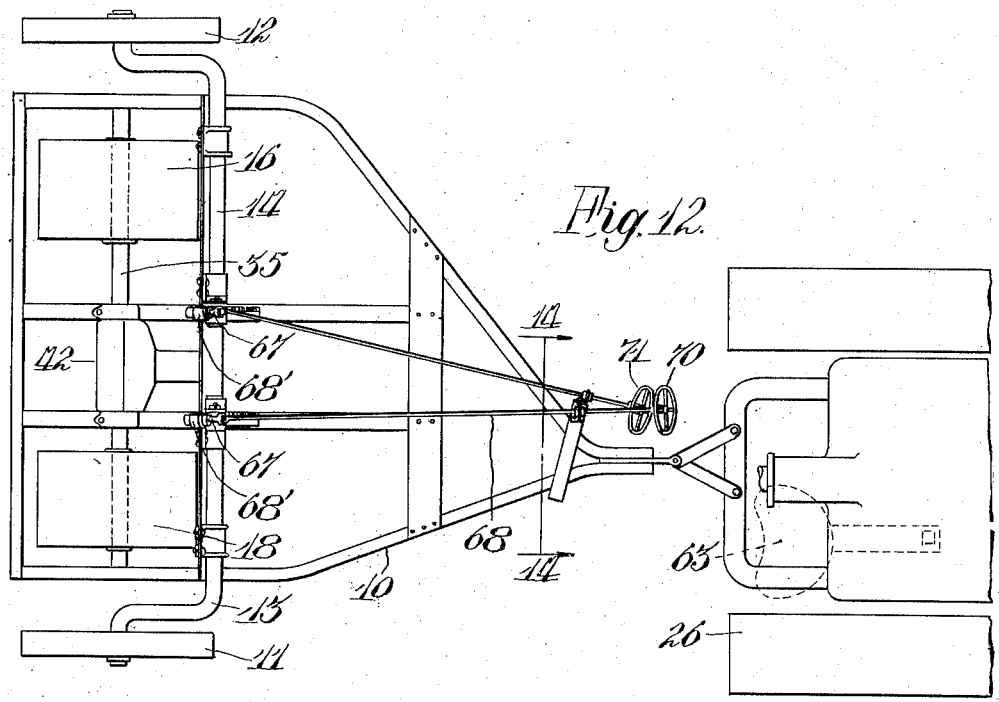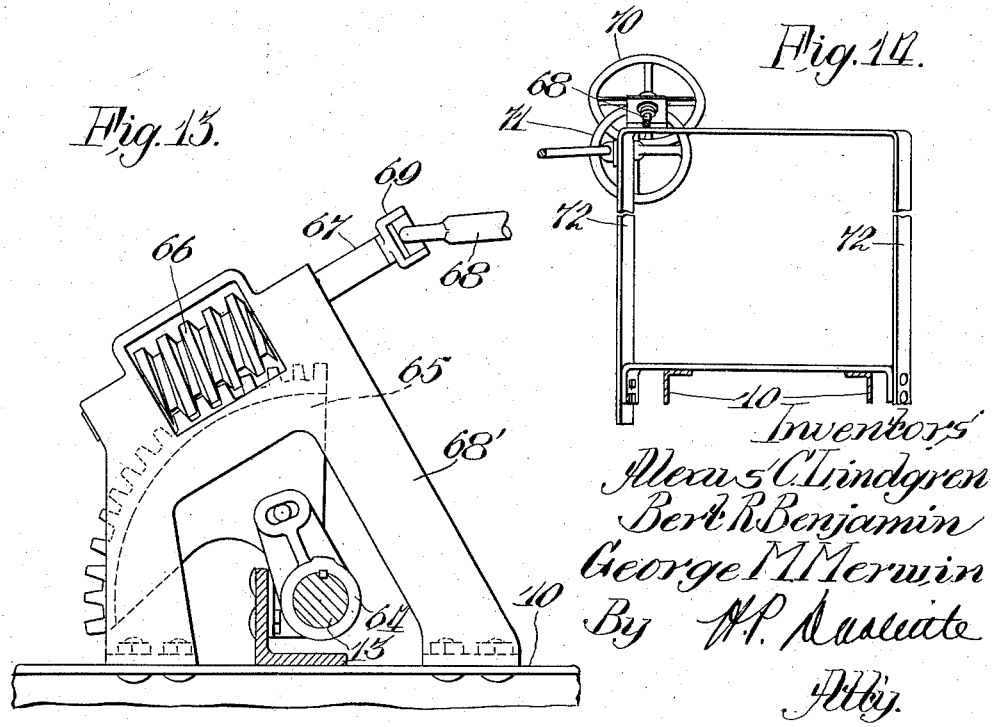

Patented Jan. 21, 1930

1,744,479

UNITED STATES PATENT OFFICE

ALEXUS C. LINDGREN, OF CHICAGO, BERT R. BENJAMIN, OF OAK PARK, AND GEORGE M. MERWIN, OF CHICAGO, ILLINOIS, ASSIGNORS TO INTERNATIONAL HARVESTER COMPANY, A CORPORATION OF NEW JERSEY

ATTACHMENT FOR STUBBLE PULVERIZERS

Application filed February 3, 1928. Serial No. 252,735.

This invention presents improvements in a stalk or stubble shredder.

An object of the invention is to provide a stubble shredder having power driven cutter heads and novel mechanism for controlling the cutter heads so that the machine may successfully meet various conditions under which it is used.

Another object of the invention is to provide novel mechanism for guiding stubble and stalks into the paths of the cutter heads of the machine.

A further object of the invention is to provide an improved device for depressing stalks before they come in contact with the cutter heads.

A further object of the invention is to provide a novel structure for preventing either cutter head from dropping into narrow ditches or depressions in the ground as the machine is operated.

Other objects of the invention will appear as the accompanying description proceeds.

The embodiments of the invention are shown in the attached drawings, in which:

Figure 1 is a plan showing the illustrative stubble shredder and illustrating the arrangement of the parts forming the present invention;

Figure 2 is a detail cross section taken on the section line 2—2 of Figure 1 and showing the structure of the over-running clutch;

Figure 3 is a detail view of one of the independently operable adjusters used for independently controlling the different cutter heads of the machine;

Figure 4 is a detail, perspective view showing the mechanism for guiding stalks and stubble into the path of a cutter head and also showing the stalk depressing device;

Figure 5 is substantially a longitudinal side elevation of the machine illustrated in Figure 1;

Figure 6 is a detail view showing the detent sector of one of the independently operable adjusters illustrated in Figures 1 and 3;

Figure 7 is a detail view of the lost motion connection of one of the hand levers of the independent adjusters;

Figure 8 is a detail, sectional view through the structure shown in Figure 7;

Figure 9 is a detail view illustrating the arrangement of one of the shredder or cutter elements with relation to a fixed cutter element of a stationary concave;

Figure 10 is a detail view showing the structure by which the stalk depressing devices are controlled;

Figure 11 is a transverse elevation looking rearwardly and taken in front of a stationary concave and its cooperating cutter head;

Figure 12 is a plan showing a modification of the machine illustrated in Figure 1;

Figure 13 is a detail view showing the adjuster used in the structure shown in Figure 12; and Figure 14 is a sectional view taken on the line 14—14 of Figure 12, looking forwardly of the machine.

The illustrative stubble shredder comprises a frame 10 supported by transport wheels 11 and 12. A crank axle 13 journaled transversely of the frame connects the frame and the transport wheel 11. On the other side of the machine a similar crank axle 14 is connected to the transport wheel 12.

Mechanism is provided whereby either crank axle 13 or 14 may be independently adjusted relative to the frame 10 for the purpose of varying the operation of the machine at its sides and for controlling the depth of cut of the cutter heads. This mechanism includes a hand lever 15 for manually controlling the depth of cut of the cutter head 16 and an opposite hand lever 17 for similarly controlling the cutter head 18. In Figures 7 and 8 of the drawings the manner in which the hand lever 15 is mounted upon the crank shaft 14 is illustrated. A socket block 19 is fixed upon the crank axle 14 and is formed with a socketed extension 20 extending radially from the crank axle. This extension provides a socket in which the lever 15 is mounted so as to allow lost motion between that lever and the crank axle to which it is attached. The lever 15 is pivoted to the extension 20 at 21. It will be evident from this construction that the crank axle may have limited oscillatory movement relative to the frame for any given position in which the lever 15 is held. This allows the cutter head 18 to have limited up and down play relative to the frame without transmitting damaging impacts to the rest of the machine.

The hand lever 15 above described is held in any desired position by means of a detent sector 22 which is preferably rotatively mounted upon the crank axle 14 by means of a hub 23 forming an integral part of the sector. The sector is held in position by means of a link 24 which extends forwardly to the hand lever 25 of a controller, by which both of the crank axles and both of the cutter heads may be moved in unison. The hand lever 25 is mounted within easy reach of the operator upon the tractor 26, and is adapted to be held in any desired position through cooperation with a suitable detent sector 27. Extending rearwardly from the hand lever 25 is another rod or link 28 connected to the hand lever 17 which controls the crank axle 13 through a series of elements similar to those which have just been described as connecting the lever 15 with the crank axle 14.

It will be evident from the above description that the depth of cut of either the cutter heads 16 or 18 may be changed independently of the other by operating one of the adjuster levers 15 or 17. This is particularly advantageous where one of the cutter heads is operating upon a row of stubble located at a higher level than the row acted upon by the other cutter head. Under most circumstances it is sufficient that the cutter heads be moved vertically in unison, this action being accomplished by the appropriate operation of the controller through the lever 25.

In order that the lost motion connection between each one of the crank axles and its adjusting lever may function properly, a counter-balancing spring connects each crank axle with the frame. One of these springs is illustrated clearly in Figure 5 of the drawings. In this case, the spring 30 is anchored at its rear end to a support 31 secured to the frame 10. At its other end, the spring is secured to an upright 32 rigidly secured to the crank portion 33 of the crank axle 13. In a similar manner, a counter-balancing spring 34 connects the crank axle 14 with the frame.

The cutter heads 16 and 18 are fixed upon a transverse shaft 35 carried rearwardly of the crank axles, as shown. In the present instance, the shaft 35 is operated by power derived from the power take-off 36 of the tractor 26. The power transmitting connections between the power take-off and the shaft 35 include the universal joints 37, 38, and 39, the shafts 40 and 41, and suitable gearing mounted with the gear case 42.

Machine breakage under such conditions as the sudden stoppage of the tractor while the cutter heads 16, 18 are running is prevented by means of an over-running clutch preferably interposed between the gear case 42 and the shaft 41. This over-running clutch device includes a ratchet housing 43 non-rotatively mounted on the shaft 41. Internally this housing is provided with ratchet teeth 44 for receiving the pawls 45 carried by a member 46 for driving the universal joint 39. By means of this structure the cutter heads may continue running after the power has ceased to be transmitted thereto from the tractor.

Each cutter head carries a transverse series of pivotally mounted blades 48, these blades being mounted upon rods connecting the heads 49 and 50.

Figure 11 of the drawings shows a series of fixed cutter teeth 51 interposed between the blades 48 of the cutter head. The teeth 51 are secured to a stationary concave 52 which is shown in Figures 5 and 11 to be supported by a strap 53 secured to the frame 10. In the present instance, this strap is illustrated as a rigid structure formed as a runner. It is preferably a heavy iron bar which, in conjunction with the bar 54, acts as a skid to prevent the adjacent cutter head from dropping into ditches and other narrow depressions in the ground. The bar 54 is rigidly secured to the strap 53, as clearly illustrated in Figure 5 of the drawings. It presents a flat surface of substantial length longitudinally of the machine.

Mounted transversely of the forward end of the frame 10 is a rockshaft 55. Figure 4 shows the structure at one end of this rockshaft. This structure includes depending stalk or stubble guides 56 and 57 located at opposite sides of a row of stubble being acted upon by the machine. These guides may be operated so that their lower ends contact with the ground, and in this position they cause the stalks to move into the path of a cutter head. Secured to the rockshaft 55, between the stalk guide 57 and the similar guide 56, is a stalk depresser herein shown as comprising a plurality of flat spring blades 58. These blades are curved at their forward ends, as clearly shown in Figure 5 at 59. They substantially surround the rockshaft 55 and are preferably rigidly secured thereto.

Figure 5 also discloses a compression lever 60 through which the pressure of the springs 58 may be regulated. In the present instance the lever 60 is rigidly secured to the rockshaft 55, as clearly indicated in Figure 10 of the drawings. At its rearward end the lever 60 is pulled downwardly by a tension spring 61 anchored to the frame 10 at 62. The shortening of the spring 61 or the substitution of a stronger spring varies the pressure which the spring 58 exerts upon stalks in its path of movement.

Figures 12, 13 and 14 disclose a modification in which the cutter heads 16 and 18 may be independently controlled from a position near the forward end of the machine and near the operator's station 63 on the tractor 26. In this modification, the inner end of each crank axle is provided with a structure such as that indicated in Figure 13. This figure shows a crank arm 64 rigidly mounted on the crank axle 13. This crank arm has a pin and slot connection with a worm segment 65, which is preferably rotatively journaled upon the crank axle. The worm segment is operated by a worm 66 secured to a shaft 67 journaled in a bracket 68' rigidly secured to the frame 10, as indicated. The shaft 67 is connected to an extension shaft 68 by a universal joint 69. At the forward end of the shaft 68 is a hand wheel 70 arranged so that it can be conveniently operated by the tractor attendant. A hand wheel 71 is connected to the crank axle 14 by a series of elements similar to those which have just been described as connecting the crank axle 13 and the hand wheel 70. The hand wheels are rotatively supported by an upright frame 72, clearly shown in Figure 14 of the drawings.

While the invention has been described with reference to particular structures, it is to be understood that it is not limited thereto, but that it is of a scope commensurate with the scope of the subjoined claims.

What is claimed as new is:

1. A stubble shredder comprising, in combination, a transport frame, a stalk cutter carried by the frame, means for operating the cutter, a rockshaft carried by the frame in advance of the cutter, a transverse series of rearwardly extending flat stalk presser blades carried by the rockshaft and operating to press stalks downwardly against the ground in advance of and in proximity to said cutter, a depending ground engaging stalk guide carried by the rockshaft at each side of the series of blades and adjusting means carried by the frame for acting upon the rockshaft to cause the presser to exert varying degrees of downward pressure upon stalks.

2. A stalk shredder comprising, in combination, a transport frame, a pair of cutter heads carried by the frame, means for operating said cutter heads, separate crank axles rotatably mounted on the frame, a supporting wheel at the outer end of each crank axle, a manually operable adjuster at the inner end of each crank axle independently adjustable for varying the depth of cut of one cutter head with respect to the other, a common controller for simultaneously operating both of said adjusters to the same degree, and means connecting said adjusters and said controller for permitting the independent movement of either adjuster without destroying the operating connection between the controller and the crank axles.

3. A stuble shredder comprising, in combination, a transport frame, a pair of rotary cutter heads carried by the frame, means for operating said cutter heads, independently operable adjusting mechanisms carried by the frame for adjusting the vertical position of either cutter head, a pivoted detent segment for each adjusting mechanism, a controller common to the adjusting mechanisms for operating them in unison, means connecting the controller with said segments so that they will move in unison therewith, and independently operable levers carried by said adjusting mechanisms adjacent said segments so as to be locked in independent positions thereby.

4. A stubble shredder comprising the combination of a transport frame, a transverse rotary stalk cutter carried by the frame, a shaft on the frame in advance of the cutter and parallel thereto, a series of rearwardly and downwadrly extending ground engaging resilient presser blades secured to the shaft and terminating just forward of the cutter, and means for rotating the shaft to vary the vertical position of the blades.

In testimony whereof we affix our signatures.

ALEXUS C. LINDGREN.
BERT R. BENJAMIN.
GEORGE M. MERWIN.